March 5, 1963   L. F. LANDEN ET AL   3,079,667
POWER OPERATED BODY FILE
Filed Nov. 19, 1959   3 Sheets-Sheet 1

Leonard F. Landen
William C. Balogh
INVENTORS

March 5, 1963 L. F. LANDEN ET AL 3,079,667
POWER OPERATED BODY FILE
Filed Nov. 19, 1959 3 Sheets-Sheet 2
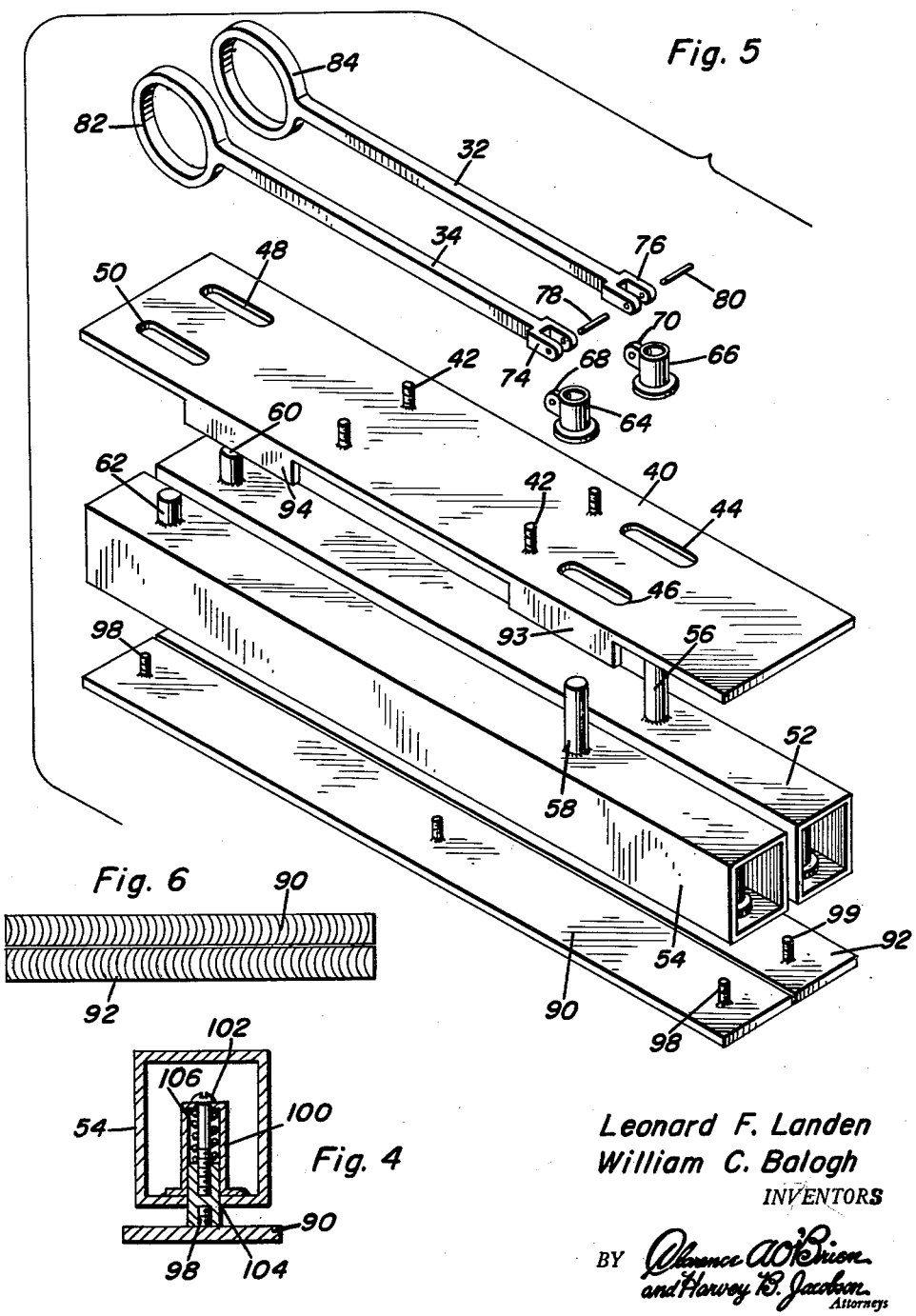
Leonard F. Landen
William C. Balogh
INVENTORS

LEONARD F. LANDEN
WILLIAM C. BALOGH
INVENTORS

BY

ATTORNEY

United States Patent Office 3,079,667
Patented Mar. 5, 1963

3,079,667
POWER OPERATED BODY FILE
Leonard F. Landen, 23226 Hazelhurst, Southfield, Mich., and William C. Balogh, 32227 Chester, Garden City, Mich.
Filed Nov. 19, 1959, Ser. No. 856,633
9 Claims. (Cl. 29—76)

This invention relates to a power operated body file and more particularly to a conversion kit for a belt sander by which the sander is converted to a body file.

One of the principal objects of the invention is to provide a power operated file wherein each file blade has its cutting stroke opposite to the adjacent blade. This eliminates any push or bucking in either direction.

A further object of the invention is to provide a power operated file whose blades cut when moving in directions opposite to each other and wherein the blades are supported in such a way so that they are capable of floating through a limited range, allowing each file blade to rise and fall in accordance with any irregularities on the panel surface that is being filed.

A further object is to provide a power operated file whose blades are flexible so that they conform to the contour of the surface being filed.

Another object of the invention is to provide a power operated body file whose principal purpose is in connection with the repair of motor vehicles but which has much wider application. A power operated body file is characterized by the suspension of the file blades and the way that they move with respect to each other, one cutting while moving forward and the other cutting while moving rearward of the main frame of the tool. Although the principles of the invention are applicable in connection with a self-contained power tool, one embodiment of the invention involves a kit to convert an ordinary belt sander into a power operated body file. A further embodiment of the invention will utilize a separate frame especially tailored for the body files.

Another object of the invention is to provide a power operated body file whose blades are adjustable in such a manner that they may have imparted to them a predetermined compressive force. In this manner, the stiffness of the file blades and their resistance to bending may be adjusted to suit the contour of the surface being filed.

A further object of the invention is to provide a practical file whose use will materially reduce the effort involved in filing metal. In the repair of motor vehicle bodies or other metal panels, the filing of the metal, lead, etc. is quite difficult and involves manual filing. Our invention considerably reduces the effort necessary on the part of the mechanic in making such repairs. Moreover, our tool is smoothly operative in that the file blades cut while moving in opposite directions, each absorbing the reaction thrust of the other.

Other objects and features of importance will become apparent in following the description of the illustrated form of the invention.

In the drawings:

FIGURE 4 is an enlarged sectional view taken on the line 4—4 of FIGURE 2 and showing a part of the means for establishing a floating mount for one of the file blades;

FIGURE 5 is an exploded perspective view of the parts that are applied in an ordinary belt sander in order to convert that sander to a body filing tool; and FIGURE 6 is a fragmentary bottom view showing schematically the motions of the two file blades, this view showing that the blades cut in a direction of motion opposite to each other.

Figure 7:
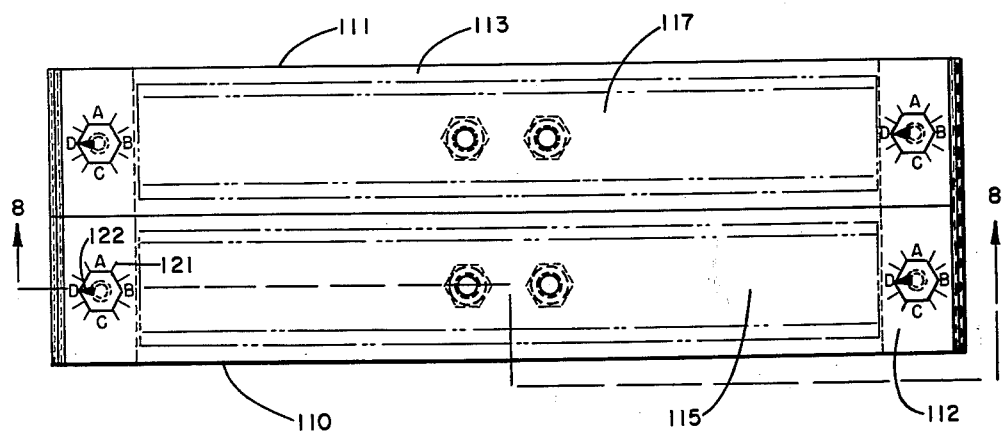
FIGURE 7 is a partial top view of a species of our invention employing adjustable leaf springs for imparting a predetermined compressive force to the file blades 110 and 111.
Figure 8:
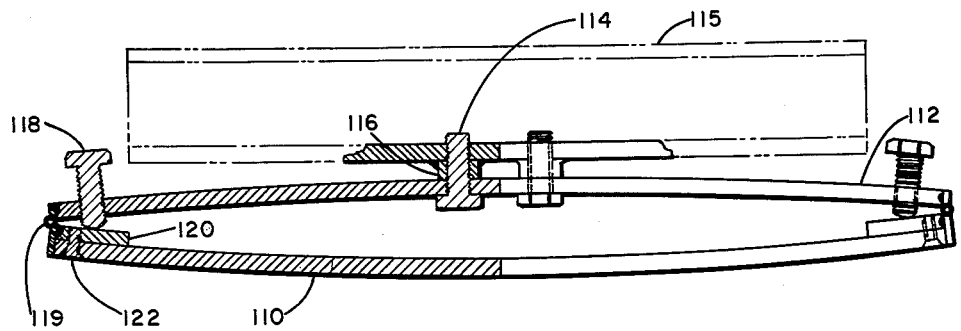

FIGURE 8 is a partial sectional view along the line 8—8 of FIGURE 7 showing, in detail, the structure by which the file blades 110 and 111 are compressed to a predetermined amount by the leaf springs to which they are connected.

In the accompanying drawings, FIGURES 1-5, there is shown a power operated body file 10 that is constructed in accordance with the invention. The illustration shows a belt sander 12 which frame 14 and other structural parts are used in the construction of the body file. The parts shown in FIGURE 5 are arranged as a kit for application to the sander 12. However, it is to be clearly understood that the invention need not be practiced in this manner. Instead of converting a belt sander, the power operated body file may have its own specially designed frame and a drive mechanism that is arranged along the lines of the drive mechanism for the file shown in FIGURE 5.

Frame 14 has a drive shaft 16 extending transversely across its lower part. Chain 18 drives a sprocket 20 on the end of shaft 16 and the chain and sprocket are encased in a housing 22. Stout bearings 24 and 26 mount the shaft for rotation. It has throws or cams 28 and 30 fixed thereto, as by welding and these are located in such a manner that the connecting rods 32 and 34 are reciprocated in opposite directions in response to rotation of shaft 16. Base plate 36 is secured by bolts 38 to the frame 14 and functions as a backing strip for the endless sanding cloth or paper in the ordinary functioning of the sander.

A mounting plate 40 is fitted beneath the plate 36 and is attached to it by studs 42 that pass through holes journaled or otherwise formed in plate 36. Fore slots 44 and 46 are in plate 40 while aft slots 48 and 50 are also in plate 40 and for a similar purpose. The purpose of all of the slots is to form a guiding function for the two holders 52 and 54 located beneath plate 40. Each holder is preferably hollow and square in cross-section. Pins 56 and 58 are fixed to the bottom walls of the holders and pass through openings in the top walls thereof as well as open through the slots 46 and 44. Aft pins 60 and 62 are similarly attached to the two holders, and they pass through the aft slots 50 and 48. Collars 64 and 66 are disposed on the upper ends of pins 58 and 56. Each collar has ears 68 and 70 respectively thereon and lower flanges which seat on the upper surface of plate 40. The ears are fitted between the forks 74 and 76 at the outer extremities of rods 34 and 32. Wrist pins 78 and 80 pass through aligned holes in the forks 74 and 76 and also in ears 68 and 70. The opposite ends of the rods have circular bearings 82 and 84 that are disposed on the throws or cams 28 and 30 thereby establishing a drive connection between the power operated shaft 16 (usually driven by an electric motor in the frame 14) and the file blade holders 52 and 54.

The file blades 90 and 92 are of standard construction insofar as their shape and the teeth are concerned. They are sufficiently flexible, however, to conform to the contour of the surface being filed. It is observed from FIGURE 6 that the blades are arranged with the teeth opposite to each other. When blade 90 is cutting as it moves in one direction with respect to frame 14, blade 92 is also cutting but it is moving in the opposite direction with respect to the frame 14. Then when the files return, neither cuts. The action of the blade holders and the blades is reciprocatory since side plates 93 and 94 which depend from one edge of plate 40 function as guides to take up side thrust of holder 54 and similar plates 95 and 96 depending from the opposite edge of plate 40, exercises a similar function with regard to blade holder 52.

Three studs 98 rise from the rear surface of blade 90 and a like number of studs 99 rise from the rear surface of blade 92. Each of the studs is accommodated in a similar shock absorbing mount which enables the flexible blade to rise and fall and also bend in accordance with the depressions over which it is moved. A typical such mount is shown in FIGURE 4 and consists of a case 100 which is fixed to the bottom wall of blade holder 54. Bolt 102 is passed through a hole in the top of the case and is threaded into bar 104 that slides as a plunger within the bore of case 100. Spring 106 seats on the substantially closed top wall of case 100 and on the upper surface of plunger 104. The spring exercises a yielding opposition to the inward movement of the plunger. Stud 98 is threaded in a tapped bore of plunger 104 thereby connecting the blade in a separable manner to the plunger.

Figure 1:
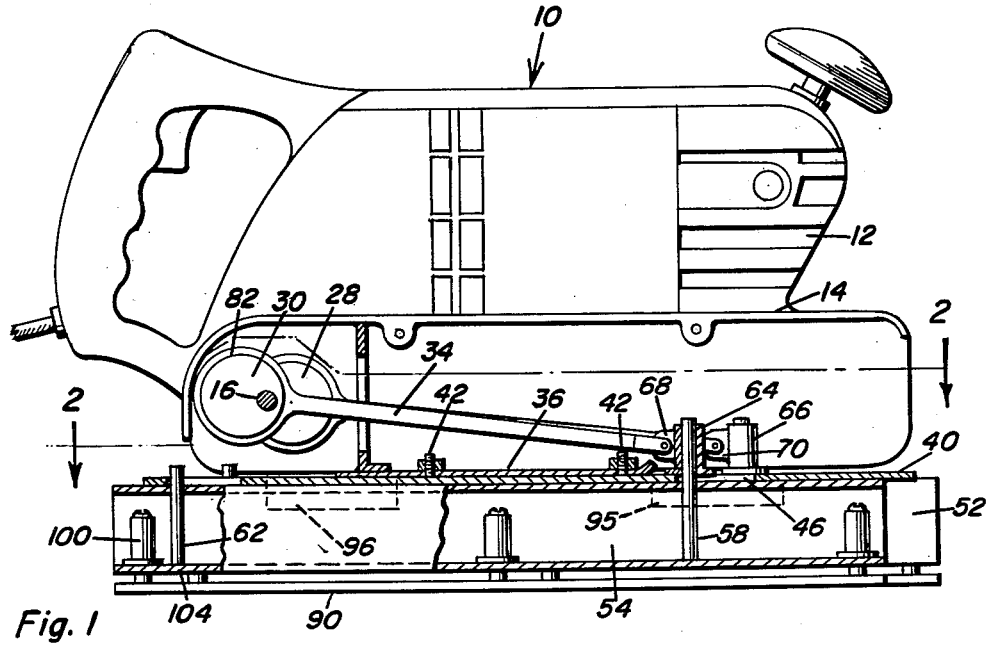
FIGURE 1 is an elevational view of a file constructed in accordance with the invention, parts being shown in section to illustrate details of construction.
Figure 2:
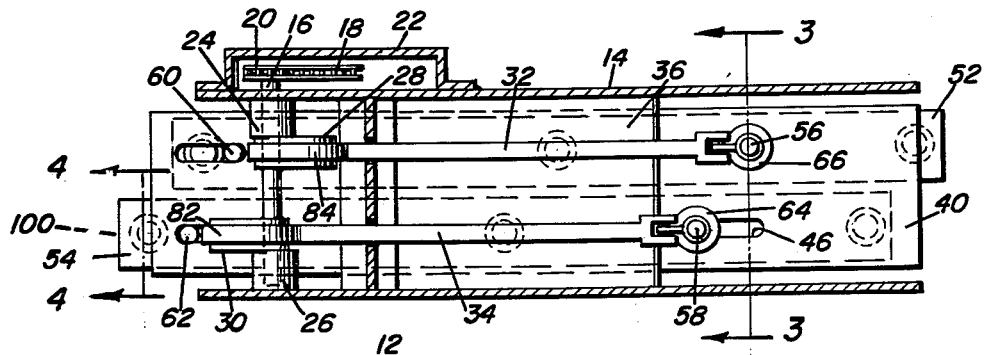
FIGURE 2 is a sectional view taken on the line 2—2 of FIGURE 1.
Figure 3:
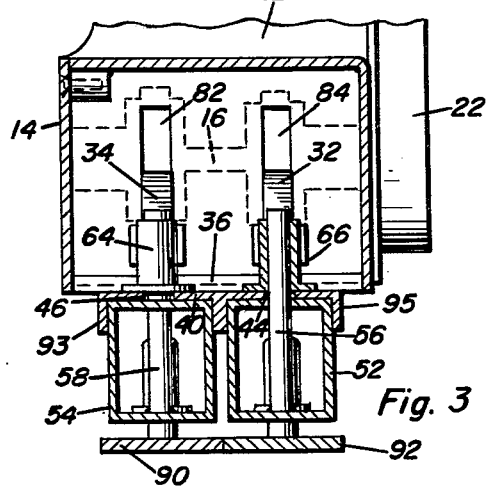
FIGURE 3 is a transverse sectional view taken on the line 3—3 of FIGURE 2.

A further species of our invention is shown in FIGURES 7 and 8 whereby the file blades 110 and 111 are adjustably and flexibly mounted on leaf springs 112 and 113. The leaf springs are connected to file blade holders 115 and 117 which function in the same manner as the file blade holders 52 and 54 as shown in FIGURE 3 of the drawings. The file blade holders 115 and 117 are shown in phantom in FIGURES 7 and 8 since these figures relate primarily to the leaf spring construction and the manner in which the leaf spring is used in adjustably compressing the file blades. The leaf springs 112 and 113 are connected to the holders 115 and 117 by means of screws 114 which are threadably engaged in bosses 116 affixed to the under portion of the blade holders by conventional means such as welding.

The leaf springs are longer than and extend beyond the ends of the blade holders 115 and 117. On the upper surface of the leaf springs, there are scribed numbers as shown at 121 in FIGURE 7. These numbers are positioned radially around threaded holes in the leaf springs. Attached to opposite ends of the leaf springs are hinge supports 119 which are affixed to the springs through conventional means such as welding. Affixed to the inner surface of the lower portion of the hinge supports 119 are spacers 120 having holes threaded therein. The file blades 110 and 111 are firmly held to the hinge supports through means of screws 122 which threadably engage the holes in spacers 120.

After being connected to the hinge supports, the blades are compressed by engaging the end of screws 118 with the upper surface of the spacers 120. Screws 118 have a pointer 122 affixed to the upper surface of their heads. As the screws are rotated so as to exert pressure against the spacers 120, the pressure applied is indicated by the position of the pointer 122 relative to the scribed markings 121 on the upper surface of the leaf springs. Through this means, it is possible to adjust to a predetermined amount the compressive force exerted on the blades 110 and 111. If the compressive force exerted on the file blades is the same at each end, the blades will be bowed downwardly so that their low point coincides with the middle of the blades. If the compressive force exerted on one end of the blade is greater than that exerted on the other end, the low point of the blade will be displaced from the middle toward the end of the blade on which the least compressive force is asserted.

As described in the preceding paragraphs, the structure possessed by the species of our invention set forth in FIGURES 7 and 8, enables adjustment of the file blades over an infinite range of compressive stresses. In use, the blades press against the surface being filed so that they tend to assume the curvature of that surface. If the surface has an extreme curvature, the screws 118 can be adjusted so that the file blades are placed under relatively slight compressive forces. This makes the blades more flexible and enables their conformance to the highly curved surface. Conversely, if the surface being filed has a more gradual contour, the blades can be adjusted so that they are more highly compressed and do not bend as readily. With the wide variety of curvatures presented by the various body surfaces of modern automobiles, it is now possible with our invention for the worker to preset the compressive force applied to the file blades so that they will be best suited for the particular surface being filed. This enables a uniformity of workmanship heretofore found impossible. The worker can now know in advance the precise setting required in order to position the file blades for any surface with an assurance that the file will perform in the desired manner.

In use the power operated file is handled much like an electrically operated belt sander. It is held by one but preferably two, hands and applied against the surface that is to be filed. The blade holders 52 and 54 are reciprocated through the action of the connecting rods and other parts of the power train between shaft 16 and the blade holders 52 and 54. It is important that the blades cut while their strokes are in opposite directions so that the reactive force of each is absorbed by the other. It is of further importance that the flexible blades be mounted so that they are capable of floating slightly and bending so as to provide for feel in the tool as the mechanic uses it and to enable the blades to ride over irregularities and depressions and to conform to the surface being filed.

In general, the power operated body file of our invention employs a relatively short stroke of the file blades in the order of one-quarter to three and one-half inches. A longer stroke can be employed although a stroke within this range is preferred since it has been found that its use enables more readily maintaining the contour of the work being filed. With a short stroke, the file blades tend to keep clean since the filed material is discharged from the blades on their return strokes. With hand files where a long stroke must be employed, the file blades quickly become dirty so that it is necessary to periodically stop and clean them before further filing can be accomplished.

The flexible nature of the file blades employed in our body file enables the file blades to adhere to the surface being filed. This is accomplished merely by exerting pressure on the file by the operator. When filing depressions or dents, our file may be placed directly over the dent so that the file blades exert pressure on either side of the dent or depression but not in it. This is important since depressions are normally filled up with solder prior to filing. The solder is softer than the adjacent metal and is, therefore, more easily removed. With hand filing, there is a tendency to remove more metal from the soldered portion than from the adjacent metal areas. As a result, the surface is not of uniform contour. Since the file blades in our file press against the adjacent hard metal areas, the portion of the file blades lying over the solder-containing depression automatically assume the correct contour of the surface as determined by the contour of the adjacent metal areas. Thus, our file bridges the solder-filled depression and maintains the true contour of the surface even though the solder is softer and more readily filed than the surrounding metal surfaces.

Because of the relatively high reciprocatory speed of the file blades in our body file, the blades have what may be defined as a hammering action in reducing or shrinking raised portions on the metal surface being filed. On their return stroke, the blades slide over the raised portion in such a manner that each file tooth imparts a downward force against the raised metal. Thus, the blades are functioning on their return stroke as well as on their forward stroke. On their return stroke, the file teeth hammer the raised portions so as to shrink them, and on their forward stroke they file the raised portions.

The hammering action of the file blades in our body file makes possible filing operations which heretofore have been found impossible. With a hand file, it is next to impossible to shrink the metal in a raised portion on the metal surface being filed. If the operator attempted to remove the projection by hand filing, he succeeded only in filing a hole through the metal which then had to be soldered or welded. It was, therefore, necessary to first shrink the projection by striking it with a hammer and then attempting to file out the hammer marks. In using our file, what was formerly accomplished in the two steps of hammering and filing is now accomplished in one operation with a file whose blades cut on their forward stroke and hammer on their return stroke.

A further benefit accruing from the use of our improved body file is that the metal is heated by the rapid action of the file blade. In the case of filing with a high speed grinding disc or high speed sander, heating of the metal can be a disadvantage since it is difficult to control. Our file does not cause such extreme heating so that the heating can, with reasonable care by the operator, be used to great advantage. As is commonly known, warm metal is softer and easier to cut than cold metal. This enables the use of badly worn file blades in our body file which would not be suitable for hand filing. They perform very well in our file, however, since the soft, warm metal is readily cut even with dull blades.

The foregoing description is considered as illustrative only and should not be implied as limiting the scope of our invention. Numerous modifications and changes, such as for example operating the file from a remote power source connected to the drive shaft 16 through means of an adjustable shaft, are within the scope of our invention. Further, it is not necessary that the file blades be rectangular in cross section as shown. For certain types of surfaces, it may be desirable to employ file blades having, for example, a half-round or semi-circular cross section. It as an essential feature of our invention, however, that the file blades be flexible so that they can conform to the surface being filed. Use of blades having a cross sectional area which would not permit flexibility is, therefore, not within the scope of the invention.

Having fully defined our invention, we desire to be limited only within the scope of the appended claims.

This application is a continuation-in-part of application, Serial No. 671,290, filed July 11, 1957, now abandoned.

We claim:

1. In a power operated body file including a frame, guide means mounted on the underside of said frame, a file blade holder positioned slidably against said guide means, and drive means mounted in said frame for imparting reciprocatory movement to said file blade holder, the improvement comprising a flexible file blade, a flexible support means connecting said file blade to said file blade holder, which support means can flex in both a vertical and horizontal direction so that said file blade can flex both vertically and horizontally and thereby conform to the surface being filed.

2. The power operated body file of claim 1 wherein the adjusting means comprises a screw threadably engaged in said spring means and bearing against said flexible file blade.

3. The file of claim 1 wherein said spring means is a leaf spring having a plurality of holes drilled therethrough at positions adjacent its ends, said flexible file blade connected to said leaf spring through hinge means affixed to the ends of said leaf spring and also to said file blade, adjusting means comprising a screw threadably engaged in said holes in said leaf spring and engaging the upper surface of said flexible file blade so that one rotation of said screw said blade is placed under a predetermined compressive force.

4. In a power operated body file including a reciprocatory file blade holder, the improvement comprising a flexible support means mounted on the underside of said file blade holder which support means is capable of flexing in both a vertical and horizontal direction, a flexible file blade adjustably connected to said support means, and adjusting means mounted on said support means in operative relation to said file blade whereby said file blade can be placed under a predetermined compressive force.

5. The power operated body file of claim 1 in which the length of stroke of said file blade ranges between about ¼ to about 3½ inches.

6. A power operated body file comprising a frame, guide means mounted on the underside of said frame, file blade holders positioned slidably against said guide means, drive means mounted on said frame and connected to said file blade holders so that the holders are reciprocated with the adjacent holders being reciprocated in opposite directions, a plurality of flexible file blades in which adjacent blades are positioned with their cutting surfaces oppositely disposed and flexible support means capable of flexing in both a horizontal and vertical direction connecting said blades and said holders so that the blades can flex in both a horizontal and vertical direction and can thereby conform to the surface being filed.

7. The power operated body file of claim 6 in which adjusting means are mounted on said flexible support means in operative relation with said file blades whereby said file blades can be placed under a predetermined compressive force.

8. The power operated body file of claim 7 wherein the adjusting means compries a screw threadably engaged in said flexible support means and bearing against said flexible file blade.

9. The power operated body file of claim 6 wherein said flexible support means is a leaf spring having a plurality of holes drilled therein at positions adjacent its ends, hinge means affixed to the ends of said leaf spring and being connected to said file blade, adusting means comprising a screw threadably engaged in said holes in said leaf spring and engaging the upper surface of said flexible file blade so that on rotation of said screw, said blade is placed under a predetermined compressive force.

References Cited in the file of this patent

UNITED STATES PATENTS

| | | |
|---|---|---|
| 1,818,361 | Schwabe | Aug. 11, 1931 |
| 2,268,292 | Lovelace | Dec. 30, 1941 |
| 2,282,648 | Drefahl | May 12, 1942 |
| 2,350,779 | Lapkoff | June 6, 1944 |
| 2,493,226 | Cole | Jan. 3, 1950 |
| 2,666,978 | Skillman | Jan. 26, 1954 |